Sept. 3, 1963 L. J. CRAIN 3,102,708
RETRACTABLE ROPE HOOK
Filed Sept. 12, 1961
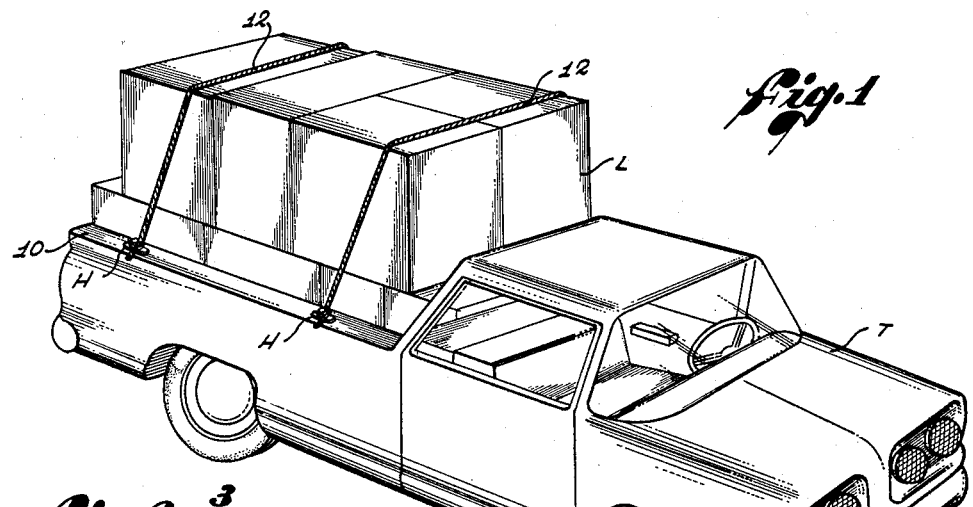
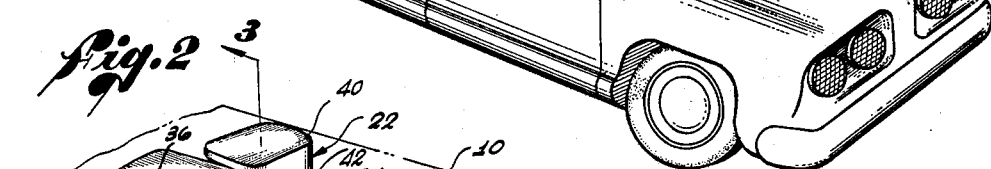
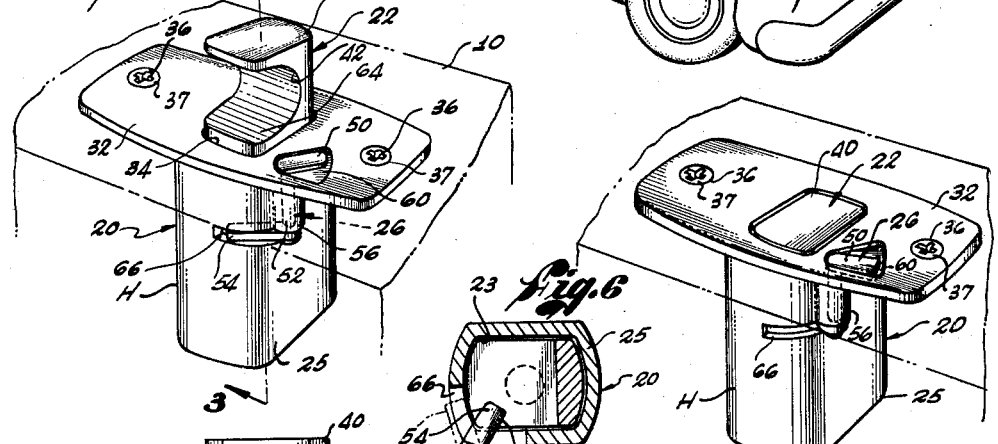
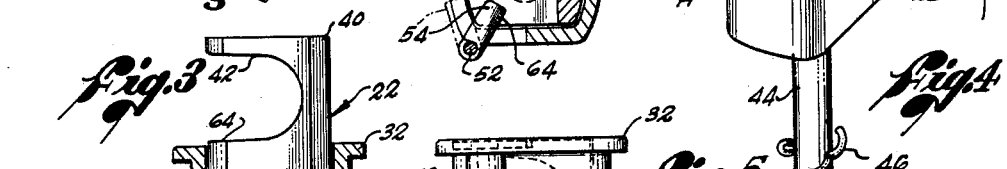
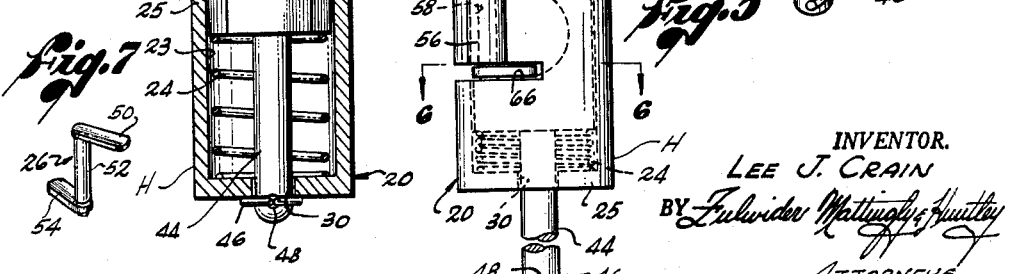
INVENTOR.
LEE J. CRAIN
BY *Fulwider Mattingly & Huntley*
ATTORNEYS

United States Patent Office 3,102,708
Patented Sept. 3, 1963

3,102,708
RETRACTABLE ROPE HOOK
Lee J. Crain, Bakersfield, Calif., assignor to Superior Industries, Inc., North Hollywood, Calif., a corporation of California
Filed Sept. 12, 1961, Ser. No. 137,695
2 Claims. (Cl. 248—361)

The present invention relates generally to rope hooks and more particularly to a new and novel retractable rope hook.

Rope hooks have for many years been in widespread use on automotive trucks. These rope hooks are secured to the sides of the truck beds and have removably attached thereto the opposite ends of load tie-down ropes. Generally, the existing rope hooks of this nature are fixed and extend upwardly of the top rails of the truck bed and therefore are subjected to inadvertent contact at such time as the tie-down ropes are not attached thereto. Such contact can be cause of painful and even serious injuries to personnel loading and unloading the truck.

It is a major object of the present invention to provide a rope hook which is completely retractable when not in use.

Another object of the invention is to provide a retractable rope hook which is simple in design and rugged of construction whereby it may afford a long and trouble-free service life.

A further object of the present invention is to provide a retractable rope hook which has a minimum number of parts and may be constructed and sold at a low cost.

Yet another object of the present invention is to provide a retractable rope hook which is foolproof in operation.

An additional object of the present invention is to provide a retractable rope hook which may be readily mounted on a vehicle in a minimum of time and without the use of special tools.

These and other objects and advantages of the present invention will become apparent from the following detailed description, when taken in conjunction with the appended drawings wherein:

FIGURE 1 is a perspective view of an automotive truck whereon a plurality of retractable rope hooks embodying the present invention are installed;

FIGURE 2 is a perspective view of a preferred form of retractable rope hook embodying the present invention, with the parts thereof shown in position to receive a rope;

FIGURE 3 is a vertical sectional view taken on line 3—3 of FIGURE 2;

FIGURE 4 is a perspective view similar to FIGURE 2 but showing the parts of said rope hook in a retracted position;

FIGURE 5 is a side elevational view of said rope hook with the parts thereof disposed in the same position as in FIGURE 4;

FIGURE 6 is a horizontal sectional view taken on line 6—6 of FIGURE 5; and

FIGURE 7 is a latch utilized with said rope hook.

Referring to the drawings, there is shown in FIGURE 1 an automotive truck T having a bed for receiving a load L. The top rails 10 of the truck T are provided with a plurality of retractable rope hooks H embodying the present invention. It should be understood that only the right-hand top rail is visible in FIGURE 1 but that an identical left-hand top rail is also provided with a pair of rope hooks similar to those shown mounted on the right-hand top rail. A tie-down rope 12 extends between the rope hooks H mounted on the left-hand and right-hand tie rails.

Referring now to FIGURE 2, there is shown a preferred form of retractable rope hook H embodying the present invention mounted on the aforementioned top rail 10. In FIGURE 2 the rope hook H is shown with its parts disposed in position to receive a tie-down rope 12. In FIGURE 4 the parts of the retractable rope hook H are shown in their retracted condition.

More particularly, the hope hook H includes a housing generally designated 20, a hook member generally designated 22 vertically slidably disposed within a cavity 23 defined by the housing, a coil compression spring 24 biasing the hook member 22 upwardly toward its raised position of FIGURE 2 interposed between the housing and the hook member, and a latch generally designated 26 for controlling the movement of the hook member 22. The housing 20 includes a body 25 preferably formed by casting. The upper end of the housing body 25 is open while the lower end thereof is centrally formed with a bore 30. The upper portion of the housing 24 is integrally formed with a horizontal mounting plate 32. The mounting plate 32 includes an opening 34 that corresponds to the internal horizontal cross-section of the body 25. A pair of bores 36 are formed at either side of the mounting plate 32 to receive attachment screws 37.

The hook member 22 includes a head 40 that is formed with an arcuate groove 42 for receiving one of the ropes 12. A guide post 44 depends from the underside of the head 40 and is integral therewith. The lower end of the guide post 44 is slidably disposed within the housing bore 30. The head 40 is disposed within housing cavity 23 coaxial with the post 44. The horizontal sectional configuration of the head 40 generally corresponds to the internal configuration of the housing cavity 23 except that the dimensions of the head 40 are smaller whereby it may undergo ready vertical slidable movement relative to the housing 20. A cotter pin or other retainer 46 extends through a bore 48 formed in the lower end of the post 44 to restrain unrestricted movement of the hook member 22 relative to the housing 20 above the position indicated in FIGURES 2 and 3.

The latch 26 is supported by the housing 20. This latch includes a horizontal actuating lever 50, a vertical rod 52 rigidly affixed to one end of the actuating lever 50 and an elongated horizontal detent 54 having one of its ends rigidly affixed to the lower end of the vertical rod 52. The vertical rod 52 is pivotally supported within a vertically extending boss 56 that is integrally formed on the upper front portion of the housing 20. The boss 56 is provided with a vertical bore 58, with such bore rotatably receiving the rod 52. The actuating lever 50 is disposed within a pocket 60 formed in the mounting plate 32 to one side and forwardly of the opening 34. The detent 54 is engageable with the lower portion of the arcuate groove 42 of the head 40 at a point designated 64 in the drawings. The front side of the housing 20 is formed with a horizontal slot 66 to permit horizontal pivotal movement of the detent 54 between its dotted outline position of FIGURE 6 and its solid outline position therein.

In the operation of the aforedescribed retractable rope hook, the hook member 22 is normally maintained in its raised rope-receiving position of FIGURES 2 and 3 by the compression spring 24. At this time the detent member 54 is free of engagement with the hook member 22 and is disposed in its dotted outline position of FIGURE 6. When the hook member 22 is to be disposed in its non-operated retracted condition it is depressed to its position of FIGURES 4 and 5. The actuating lever 50 is then pivoted clockwise relative to the drawings so as to move the detent 54 from its dotted outline position of FIGURE 6 to its solid outline position therein. The detent 54 will thereupon engage the recess 42 at the portion 64 thereof so as to positively restrain the lock member 22 against upward movement relative to the housing 20. When the hook member 22 is to be again raised into its operative position the actuating lever 50 is merely pivoted in a counterclockwise direction relative to the drawings to its original position. This will serve to return the latch detent 54 from its solid to its dotted outline position in FIGURE 6. In the latter position the detent 54 is clear of the head 40 of the hook member 22 whereby the spring 24 can automatically urge the head 40 upwardly into its rope-receiving position.

The aforedescribed retractable rope hook may be readily installed in a minimum of time and without the use of special tools. It is only necessary to form an opening in the top rail 10 to receive the housing 20. Thereafter, the attachment screws 37 are screwed into place. Alternatively, a suitable bolt and nut combination may be substituted for the attachment screws. Although the aforedescribed retractable rope hook has been described in conjunction with an automotive truck it may also find a wide variety of uses in other applications as for example boats, homes or house trailers.

While there has been shown and described hereinbefore what is considered to be a preferred embodiment of the present invention, it will be apparent that various modifications and changes may be made thereto without departing from the spirit of the invention or the scope of the following claims.

I claim:

1. A retractable rope hook, comprising: a housing having a body formed with a cavity and a horizontal mounting plate on the upper end of said body, the latter being formed with an opening aligned with said cavity, the lower end of said body being formed with a bore; a hook member movable between a lower retracted position and a raised rope-receiving position, said hook member including a head formed with a rope-receiving recess and a guide post depending from said head through said housing bore, said head being vertically slidably carried within said cavity with its upper surface being flush with said plate when said hook member is in said retracted position; means interposed between one end of said guide post and said housing limiting upward movement of said hook member beyond said raised position; biasing means in said cavity engaging said head and urging said head upwardly; a latch having a vertical rod rotatably supported by said housing body, an actuating lever secured to said rod and disposed on said mounting plate and a locking detent secured to the lower end of said rod, said latch being movable between a first position wherein said detent engages said head to secure the latter in said lower position, with said latch being rotatable to a second position wherein said detent is free of said head whereby said biasing means raises said hook member to said raised rope-receiving position.

2. A retractable rope hook, comprising: a housing having a body formed with a cavity and a horizontal mounting plate on the upper end of said body, the latter being formed with an opening aligned with said cavity, the lower end of said body being formed with a bore; a hook member movable between a lower retracted position and a raised rope-receiving position, said hook member including a head formed with a rope-receiving recess and a guide post depending from said head through said housing bore, said head being vertically slidably carried within said cavity with its upper surface being flushed with said plate when said hook member is in said retracted position; means interposed between one end of said guide post and said housing limiting upward movement of said hook member beyond said raised position; a coil spring in said cavity coaxial with said guide post and engaging the underside of said head to urge said head upwardly; a latch having a vertical rod rotatably supported by said housing body, an actuating lever secured to said rod and disposed on said mounting plate and a locking detent secured to the lower end of said rod, said latch being movable between a first position wherein said detent engages said head to secure the latter in said lower position, with said latch being rotatable to a second position wherein said detent is free of said head whereby said spring may raise said hook member to said raised rope-receiving position.

References Cited in the file of this patent

UNITED STATES PATENTS

| | | |
|---|---|---|
| 302,509 | Mauthner | July 22, 1884 |
| 524,782 | Mason | Aug. 21, 1894 |
| 714,144 | Chapman | Nov. 25, 1902 |
| 828,823 | Maize | Aug. 14, 1906 |
| 2,614,871 | Grizzard et al. | Oct. 21, 1952 |
| 2,729,417 | Maynard | Jan. 3, 1956 |
| 2,786,428 | Arnold | Mar. 26, 1957 |
| 2,825,112 | Frieder et al. | Mar. 4, 1958 |
| 3,043,550 | Garbarino | July 10, 1962 |

FOREIGN PATENTS

| | | |
|---|---|---|
| 1,892 | Switzerland | Feb. 12, 1890 |